US005844706A

United States Patent [19]

Kohn et al.

[11] Patent Number: 5,844,706

[45] Date of Patent: Dec. 1, 1998

[54] FIBRE-OPTIC COMMUNICATIONS-TRANSMISSION METHOD AND INTERMEDIATE REPEATER FOR USE IN THE METHOD

[75] Inventors: Ulrich Kohn, Backnang; Ernst-Ulrich Scheuing, Allmersbach; Friedrich-Christian Tischer, Backnang, all of Germany

[73] Assignee: Robert Bosch GmbH, Stuttgart, Germany

[21] Appl. No.: 617,920

[22] PCT Filed: Sep. 15, 1994

[86] PCT No.: PCT/DE94/01063

§ 371 Date: Mar. 4, 1996

§ 102(e) Date: Mar. 4, 1996

[87] PCT Pub. No.: WO95/09491

PCT Pub. Date: Apr. 6, 1995

[30] Foreign Application Priority Data

| | | | |
|---|---|---|---|
| Sep. 30, 1993 | [DE] | Germany | 93 20 438 U |
| Jun. 22, 1994 | [DE] | Germany | 44 21 441.3 |

[51] Int. Cl.[6] .......... H04B 10/16

[52] U.S. Cl. .......... 359/179; 359/176

[58] Field of Search .......... 359/110, 177, 359/176, 175, 174, 179, 341

[56] References Cited

U.S. PATENT DOCUMENTS

| | | | |
|---|---|---|---|
| 4,833,668 | 5/1989 | Rowley et al. | 359/174 |
| 4,980,891 | 12/1990 | Izadpanah . | |
| 4,982,466 | 1/1991 | Lord et al. | 359/174 |
| 5,097,353 | 3/1992 | Fujiwara et al. | 359/177 |
| 5,485,299 | 1/1996 | Jones | 359/177 |
| 5,502,810 | 3/1996 | Watanabe | 359/177 |
| 5,513,029 | 4/1996 | Roberts | 359/177 |

FOREIGN PATENT DOCUMENTS

| | | |
|---|---|---|
| 0445364 | 11/1990 | European Pat. Off. . |
| 0440276 | 1/1991 | European Pat. Off. . |
| 0572890 | 5/1993 | European Pat. Off. . |
| 4212603 | 4/1992 | Germany . |

OTHER PUBLICATIONS

IEEE Photonics Technology Letters, vol. 4, No. 7, 1992, pp. 717–720.

Patent Abstracts of Japan, vol. 16, No. 52, 1992, E–1164.

*Primary Examiner*—Rafael Bacares
*Attorney, Agent, or Firm*—Michael J. Striker

[57] ABSTRACT

The invention relates to an optical communication-transmitting system for transmitting at least one useful signal with a high bit rate, which has intermediate repeaters ($ZV_1$-$ZV_n$) with optical fiber amplifiers ($OV_{ss}$, $OV_1$-$OV_n$, $OV_{es}$) and which uses at least one additional signal of a low bit rate, for example for monitoring the intermediate repeater. For a transmission system requiring small outlay, the additional signal is transmitted on a wide band in comparison to the useful signal, for example by means of luminescence diodes ($S_{ss}$, $S_1$-$S_n$) and is amplified by the fiber amplifiers ($OV_{ss}$, $OV_1$-$OV_n$, $OV_{es}$) in the same manner as the useful signal. For transmitting and receiving the additional signal, a transmitter ($S_1$) is preferably disposed in an intermediate receiver ($ZV_1$) upstream of the fiber amplifier ($OV_1$) and a receiver preferably downstream thereof. The additional signal is transmitted in time-division multiplex in a frame, which assigns each intermediate repeater its own time slot. The narrow-band and the wide-band signals can be separated with simple means from each other in receivers ($E_1$-$E_n$, $E_{es}$, EA).

15 Claims, 2 Drawing Sheets

FIBRE-OPTIC COMMUNICATIONS-TRANSMISSION METHOD AND INTERMEDIATE REPEATER FOR USE IN THE METHOD

BACKGROUND OF THE INVENTION

The instant invention relates to an optical communication-transmitting method for transmitting at least one useful signal with a high bit rate over an optical waveguide with at least one transmitting station containing a transmitter for transmitting at least one additional signal with a low bit rate, and with at least one intermediate repeater having an optical amplifier and an optical receiver for receiving the additional signal and a transmitter for transmitting a further additional signal derived from it and to an intermediate repeater with an optical line input for useful signals with a high bit rate and for an additional signal with a low bit rate in a time slot, an optical line output for the useful signals with the high bit rate and for a further additional signal with a low bit rate in another time slot, an optical amplifier for the signals and with an one optical receiver for the additional signal and transmitter for the further additional signal of a low bit rate.

An optical communication-transmitting system is known from EP 440 276 A2, wherein a useful signal with a high bit rate, for example several hundred Mbits/s, and an additional signal with a lower bit rate, for example less than 300 kbits/s, are transmitted. The additional signal is transmitted at a wave length which is different from the one at which the useful signal is transmitted. Only the useful signal is amplified in an intermediate repeater by means of an optical amplifier, the additional signal is uncoupled from the fiber upstream of the optical amplifier by means of a wavelength-division multiplexer, is opto-electrically converted, processed and optically coupled back into the fiber downstream of the fiber amplifier. Such an intermediate repeater requires a relatively large technical outlay.

A further communication-transmitting system is known from EP 445 364 A2, in which signals of different wavelength are transmitted via an optical fiber. Here, too, one signal is amplified by means of an optical amplifier, while the other signals are shunted around the optical amplifier via wavelength couplers and a bypass line.

Optical communication-transmitting systems are known from EP 572 890 A1 and DE 42 12 603 A1, in which signals with a high bit rate are transmitted by means of the time-division multiplex method.

SUMMARY OF THE INVENTION

It is the object of the invention to provide an optical communication-transmitting method and an intermediate repeater for it, which can be realized with the smallest possible technical outlay.

In the operation of an optical communication-transmitting system containing intermediate repeaters, an additional signal besides the useful signal is required as a rule, for example for monitoring and locating purposes or as a service signal, for example for service telephones. The useful signal (NS) is used for transmitting the useful information and is a signal of a relatively high bit rate. In contrast thereto, the additional signal (ZS) as a rule is a signal of a relatively low bit rate. During optical transmission of both signals it is necessary to transmit the useful signal (NS) by means of a narrow-band optical carrier signal, because otherwise dispersion effects of the optical waveguide limit the range of the signal. It is generated as a rule by a laser transmitter. In contrast thereto, the optical bandwidth of the optical carrier signal used for the transmission of the additional signal (ZS) can be of a wider bandwidth because of the low bit rate to be transmitted. It can be generated, for example, by a luminescence diode (light-emitting diode) or a super-luminescence diode. Both optical carrier signals are transmitted via the same optical waveguide which, during opposite direction operation, respectively applies for each direction of transmission.

According to the invention a time-division multiplex system with a frame and a number of time slots is used for the transmission of the additional signal (ZS). In this case (at least) n time slots are utilized over a path with n intermediate repeaters, so that one time slot can be assigned to each intermediate repeater. The transmission capacity of each time slot must be sufficiently large here, so that the sum of all information to be transmitted by all intermediate repeaters of a path can be transmitted within one single time slot. The additional signal (ZS) is received in a defined intermediate repeater in a defined (prior) time slot and is evaluated. The information contained therein is combined with the information of the respective station and transmitted during the subsequent time slot.

When using the time-division multiplex method described, it is possible to couple the optical transmitter for generating the carrier signal for the additional signal (ZS) upstream and the optical receiver for receiving the additional signal (ZS) downstream of the optical fiber amplifier of the intermediate repeater, so that the fiber amplifier is used as the pre-amplifier as well as the post-amplifier for the additional signal (ZS).

Thus, both optical signals can be amplified together by means of a single optical fiber amplifier. Intermediate repeaters can be individually addressed without effort because of the formation of the described time frame with specific time slots. Mainly, however, by means of the time-division multiplex method it is prevented that the transmitted and received signals mutually interfere with each other in an intermediate repeater.

The additional signal (ZS) can be coupled into and out of the optical waveguide transmission path with the aid of a simple optical coupler, which needs not be wavelength-selective.

The additional signal (ZS) having a lower bit rate can be separated from the high-frequency spectrum portions of the useful signal (NS) with a high bit rate in the optical receiver by means of opto-electrical converters, for example a simple electrical low-pass filter, even when a wide band optical carrier signal is used. An optical filter must be used to separate the optical carrier signal of the useful signal (NS) from the optical wide-band carrier channel of the additional signal (ZS).

The optical communication-transmitting method can also be advantageously employed in systems having several optical carrier signals with several useful signals (NS). The option here is either to assign an optical narrow-band carrier signal to each useful signal (NS) for its own additional signal (ZS) with service data, or to provide an optical narrow-band or even the previously described optical wide-band carrier signal for a common additional signal (ZS) for all useful signals.

BRIEF DESCRIPTION OF THE DRAWING

The objects, features and advantages of the invention will now be illustrated in more detail with the aid of the following description of the preferred embodiments, with reference to the accompanying figures including.

DESCRIPTION OF THE PREFERRED EMBODIMENT

Figure 1:
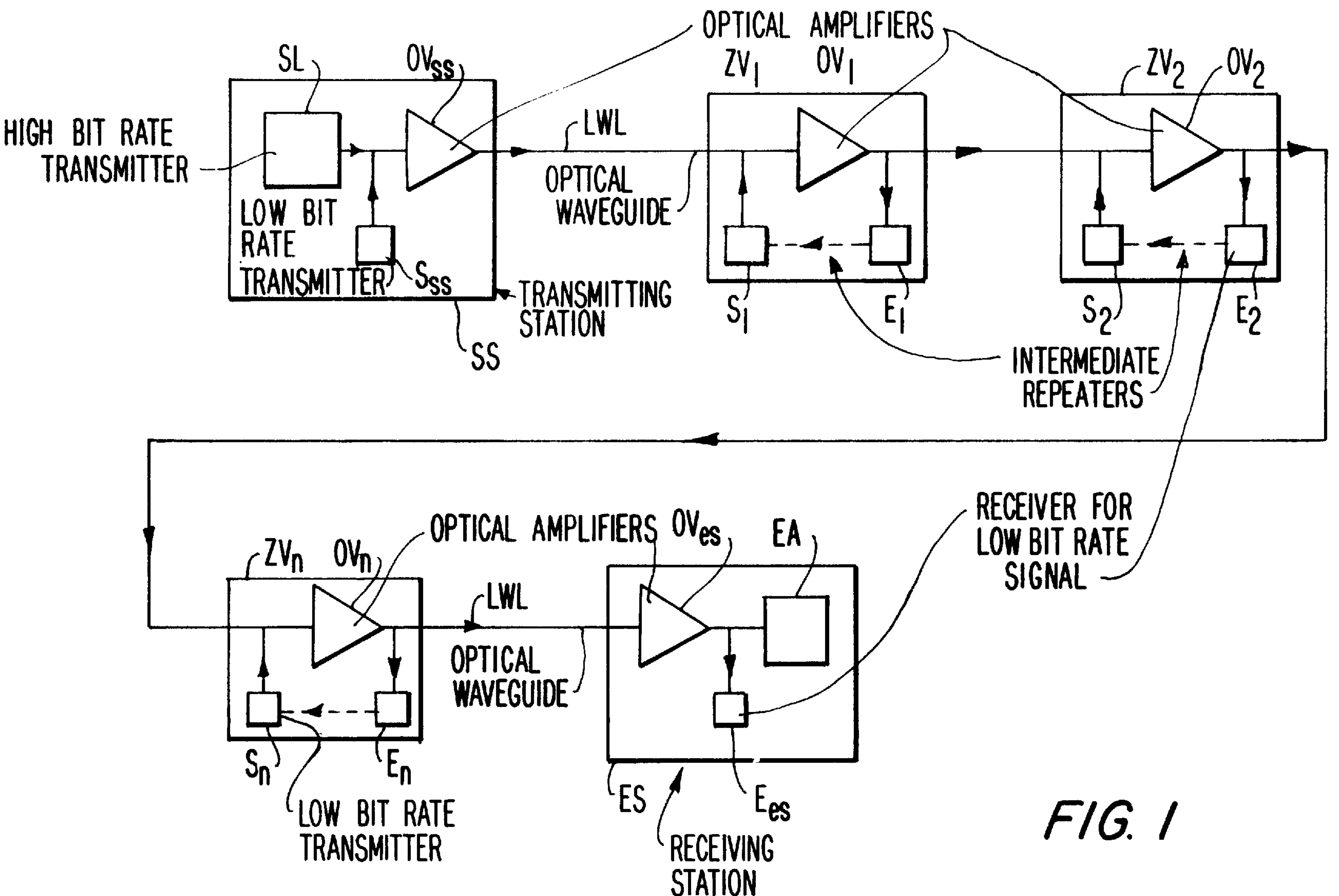
FIG. 1, an optical communication-transmitting system for transmitting a useful signal (NS) of a high bit rate, containing transmitters and receivers for transmitting an additional signal (ZS), FIG. 2, a pulse frame for an additional signal (ZS) sent in time-division multiplex, and FIG. 3, a diagram with intensity as a function of the wave length of a WDM (wavelength-division multiplex) system.

A unidirectional optical communication-transmitting system with a transmitting station SS, a receiving station ES, an optical waveguide path LWL and optical intermediate repeaters $ZV_1$, $ZV_2$, . . . , $ZV_n$ is represented in FIG. 1. A useful signal (NS) of a high bit rate, for example greater than 100 Mbits/s is modulated on an optical narrow-band carrier signal with a stable wavelength in a transmitting arrangement SL of the transmitting station SS. In this case the modulated carrier signal is generated, for example, by a semiconductor laser typically having a bandwidth of less than 1 nm. The transmitting station SS furthermore contains an optical transmitter $S_{ss}$ for transmitting an additional signal (ZS) of a low bit rate, which emits optical wide-band signals in contrast to the optical narrow-band carrier signal of the useful signal (NS). This optical transmitter $S_{ss}$ is a luminescence or super-luminescence diode, for example. The data transmitted by means of the additional signal (ZS) can have bit rates between approximately 64 kbits/s and several hundred kbits/s, for example, and contain service, monitoring and locating data. The carrier signals NS and ZS are combined in a coupler of the transmitting station SS and subsequently amplified by an optical fiber amplifier $OV_{ss}$.

Figure 3:
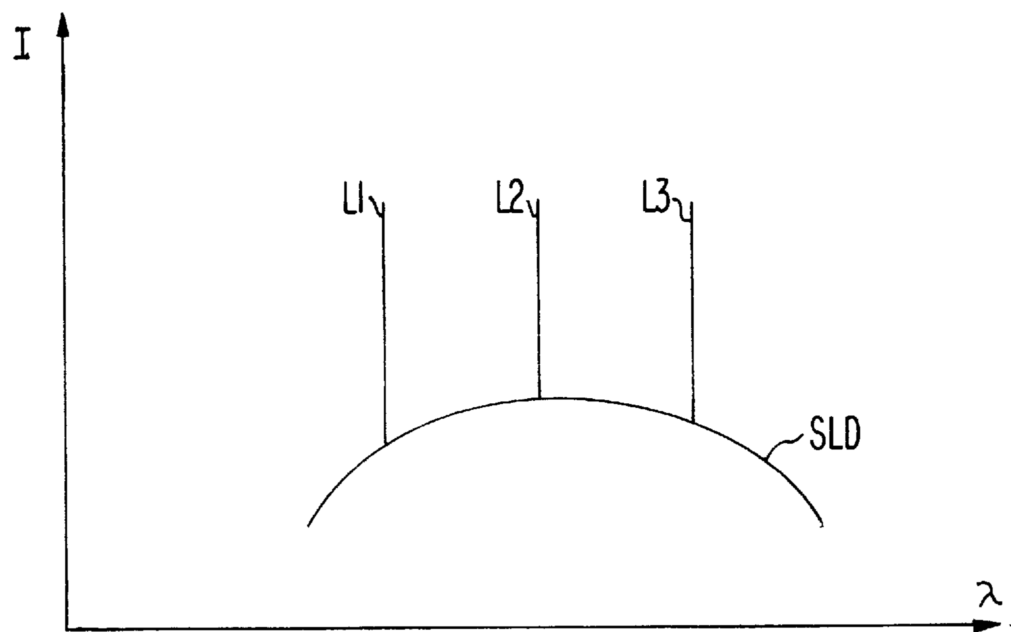

The optical carrier signals transmitted over the optical waveguide path LWL are amplified in an optical fiber amplifier $OV_{es}$ in a receiving station ES and are subsequently divided into two signal components by a non-wavelength-selective divider. The additional signal (ZS) of a low bit rate is retrieved from the one signal component in a receiver $E_{es}$ in that the signal is opto-electrically converted and separated, for example by means of an electrical low-pass filter, from the useful signal (NS) which, because of the high bit rate, only has relatively high-frequency signal components. The useful signal (NS) is obtained from the other signal component in a receiving arrangement EA in that it is filtered out by means of a narrow-band optical filter which is matched to the optical carrier signal of the useful signal (NS) and the carrier signal of the additional signal (ZS) is weakened. Because of its low spectral density downstream of the optical filter, the optical wide-band carrier signal of the additional signal (ZS) appears only as a noise-like addition to the narrow-band carrier signal of the useful signals (NS) (also see FIG. 3 and the associated description).

The optical communication-transmitting system can be controlled and monitored by means of the additional signal (ZS), in particular the intermediate repeaters $ZV_1$ to $ZV_n$ containing optical fiber amplifiers $OV_1$ to $OV_n$.

The wavelength of the optical narrow-band as well as the optical wide-band signals (NS and ZS) are selected in such a way that they essentially fall within the amplification range of the optical fiber amplifiers $OV_{ss}$, $OV_1$, . . . $OV_n$ and $OV_{es}$. For this reason both signals (NS and ZS) can be amplified by them. The bandwidth of a fiber amplifier operating in the wavelength range around 1550 nm can, for example, be 35 nm, the line width of a super-luminescence diode for example 30 nm or less. Semiconductor lasers suitable for transmitting data at high bit rates have a line width of less than 1 nm.

In the intermediate repeater $ZV_1$, a portion of the optical signal is supplied to a receiver $E_1$ downstream of the fiber amplifier $OV_1$, for example by means of a beam splitter, which extracts the carrier signal of the additional signal (ZS) from this signal portion. This takes place in the same way as already described by means of the receiver $E_{es}$ of the receiving station ES.

The additional signal (ZS) is regenerated in the intermediate repeater $ZV_1$ and is coupled, together with the data of the intermediate repeater $ZV_1$, by means of a wide-band optical transmitter $S_1$ back into the optical waveguide path LWL upstream of the fiber amplifier $OV_1$. By this arrangement the fiber amplifier $OV_1$ is advantageously used as a sensitive pre-amplifier for the receiver $E_1$ as well as a post-amplifier for the transmitter $S_1$.

Figure 2:
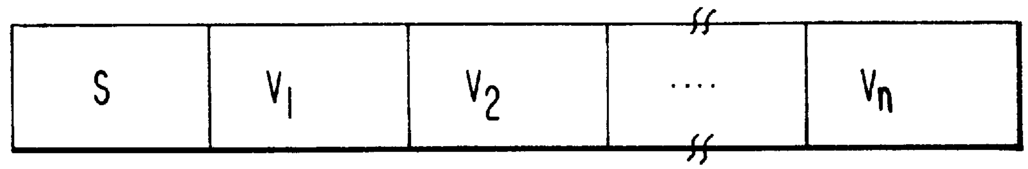

The additional signal (ZS) is transmitted in a time-division multiplex method. For this purpose a pulse frame is formed in the transmitting station SS and the data of the additional signal (ZS) with a low bit rate, transmitted by the transmitter $S_{ss}$, are assigned to a first time slot. In this case the transmitter $S_{ss}$ acts as a starter for the pulse frame. An example of a pulse frame is represented in FIG. 2. It is divided into (n+1) time slots, wherein the first time slot S is assigned to the transmitting station SS (FIG. 1), and respectively one of the time slots $V_1$ to $V_n$ to the intermediate repeaters $ZV_1$ to $ZV_n$.

The receiver $E_1$ of the intermediate repeater $ZV_1$ also receives the carrier signal at a comparatively high level of its own transmitter $S_1$, because the transmitter $S_1$ is coupled in upstream and the receiver $E_1$ downstream of the optical fiber amplifier $OV_1$ (see FIG. 1). It is therefore necessary to blank the receiver $E_1$ for the length of this time slot or at least to reduce its sensitivity. In the latter case an automatic amplification control of the optical fiber amplifier $OV_1$ can be performed by forming a control loop. For this purpose the additional signal (ZS) transmitted by its own transmitter $S_1$ is detected in the receiver $E_1$ and used as a control signal for the amplification of the fiber amplifier $OV_1$. It is of course also possible by means of an appropriate automatic amplification control to also control the other intermediate repeaters $ZV_2$ to $ZV_n$ by means of the respective receivers $E_1$ to $E_n$.

The wide-band carrier signal of the additional signal (ZS) emitted by the transmitters $S_1$ to $S_n$ need not be filtered out in the subsequent intermediate repeaters and can continue to run in the optical waveguide path LWL without interfering with the transmission. However, the transmittable bit rate is limited by the number of the intermediate repeaters $ZV_1$ to $ZV_n$, since these determine the total number of the time slots and the sum of all additional data of a low bit rate must be transmitted in one time slot.

The time-division multiplex method can be used in a manner known per se for localizing a path break or interference in the optical communication-transmitting system. This is accomplished in that an intermediate repeater generates a new pulse frame with an additional signal (ZS) when its receiver no longer receives an additional signal (ZS). It is possible to determine from this new additional signal (ZS) starting from which intermediate repeater the waveguide path still operates.

There are further possibilities of arranging the transmitter $S_1$ and the receiver $E_1$ in the intermediate repeater $ZV_1$, for example, the receiver $E_1$ can be disposed upstream of the transmitter $S_1$. In this way the receiver $E_1$ is prevented from seeing the signal at a high level from the transmitter $S_1$. But in this case the optical fiber amplifier $OV_1$ can no longer be used as a pre-amplifier for the receiver $E_1$.

The communication-transmitting method can also be applied to optical communication-transmitting systems with several useful channels, each one having a narrow-band optical carrier signal for transmitting useful signals (NS) with high bit rates. In this case all optical narrow-band carrier signals must be located within the usable amplification range of the optical fiber amplifiers. An exemplary WDM (wavelength-division multiplex signal) system will be explained by means of FIG. 3, wherein the intensity I has been plotted as a function of the wavelength lambda. It contains three optical narrow-band carrier signals L1, L2 and L3 with slightly different wavelengths generated, for example, by laser diodes, and an optical wide-band additional signal SLD, by means of which additional data of low bit rates are transmitted. Here, too, the wide-band signal SLD is generated for example by a super-luminescence diode; its wavelength range overlaps with those of the optical narrow-band carrier signals L1, L2 and L3, but its spectral intensity is comparatively low.

The four optical signals L1, L2, L3 and SLD can be separated from each other in a receiver. The signals L1, L2 and L3 are selected in this process by means of narrow-band optical filters which are matched to the corresponding wavelengths. The signals L1, L2 and L3 can be generated in one transmitting station or in different transmitting station.

In another embodiment the additional signals (ZS) is transmitted in time-division multiplex by means of a narrow-band carrier signal which is also generated for example by a semiconductor laser. The additional signal (ZS) then must be separated from the useful signal (NS) by means of an optical filter.

We claim:

1. An intermediate repeater comprising an optical line input for useful signals (NS) with a high bit rate and for additional signals (ZS) with a low bit rate in a time slot;

an optical line output for the useful signals (NS) with the high bit rate and for further additional signals with a low bit rate in another time slot;

an optical amplifier ($OV_1$ to $OV_n$) connected between the optical line input and optical line output to amplify said signals;

an optical receiver ($E_1$ to $E_n$) for the additional signals from the optical line input; and an optical transmitter ($S_1$ to $S_n$) cooperating with the optical receiver to transmit the further additional signals derived from the additional signals;

wherein the optical receiver ($E_1$ to $E_n$) is arranged downstream of the optical amplifier ($OV_1$ to $OV_n$) and the optical transmitter ($S_1$ to $S_n$) is disposed upstream of the optical amplifier ($OV_1$ to $OV_n$), so that the optical amplifier operates as a pre-amplifier for the additional signals and a post-amplifier for the further additional signals.

2. The intermediate receiver as defined in claim 1, further comprising means ($OV_1$ to $OV_n$) for controlling an amplification of said optical amplifier according to said further additional signals (ZS) from said optical transmitter ($S_1$ to $S_n$) and wherein said means for controlling comprises said optical receiver ($E_1$ to $E_n$).

3. An intermediate repeater comprising an optical line input for useful signals (NS) with a high bit rate and for additional signals (ZS) with a low bit rate in a time slot;

an optical line output for the useful signals (NS) with the high bit rate and for further additional signals with a low bit rate in another time slot;

an optical amplifier ($OV_1$ to $OV_n$) connected between the optical line input and optical line output to amplify said signals;

an optical receiver ($E_1$ to $E_n$) for receiving the additional signals from the optical line input; and an optical transmitter ($S_1$ to $S_n$) cooperating with the optical receiver to transmit the further additional signals;

wherein the optical receiver ($E_1$ to $E_n$) is disposed upstream of the optical amplifier ($OV_1$ to $OV_n$) and the optical transmitter ($S_1$ to $S_n$) is disposed upstream of the optical amplifier ($OV_1$ to $OV_n$), so that the optical amplifier does not operate as a pre-amplifier for the additional signals but does operate as a post-amplifier for the further additional signals.

4. An intermediate repeater comprising an optical line input for useful signals (NS) with a high bit rate and for additional signals (ZS) with a low bit rate in a time slot;

an optical line output for the useful signals (NS) with the high bit rate and for further additional signals with a low bit rate in another time slot;

an optical amplifier ($OV_1$ to $OV_n$) connected between the optical line input and optical line output to amplify said signals;

an optical receiver ($E_1$ to $E_n$) for receiving the additional signals from the optical line input; and an optical transmitter ($S_1$ to $S_n$) cooperating with the optical receiver to transmit the further additional signals;

wherein the optical receiver ($E_1$ to $E_n$) is disposed downstream of the optical amplifier ($OV_1$ to $OV_n$) and the optical transmitter ($S_1$ to $S_n$) is disposed downstream of the optical amplifier ($OV_1$ to $OV_n$), so that the optical amplifier does operate as a pre-amplifier for the additional signals but does not operate as a post-amplifier for the further additional signals.

5. An optical communication-transmitting method for transmitting at least one useful signal (NS) at a high bit rate over an optical waveguide by means of an optical communication-transmitting system, wherein said optical communication-transmitting system includes at least one transmitting-station (SS) and a plurality of intermediate repeaters ($ZV_1$ to $ZV_n$), said at least one transmitting station comprising an optical transmitter ($S_{ss}$) for transmitting at least one additional signal (ZS) at a low bit rate and each of said intermediate repeaters ($ZV_1$ to $ZV_n$) comprising an optical amplifier ($OV_1$ to $OV_n$) and an optical receiver ($E_1$ to $E_n$) for receiving the at least one additional signal (ZS) and an optical transmitter ($S_1$ to $S_n$) cooperating with the optical receiver ($E_1$ to $E_n$) to transmit at least one further additional signal (ZS) derived from the at least one additional signal, wherein said method comprises transmitting the at least one additional signal (ZS) via an optical carrier signal by means of a time-division multiplex method so that information-bearing signals from individual ones of the intermediate repeaters ($ZV_1$ to $ZV_n$) are processed separately.

6. The optical communication-transmitting method as defined in claim 5, further comprising assigning a specific time slot ($V_1$ to $V_n$) for transmitting the at least one additional signal (ZS) to each of said intermediate repeaters ($ZV_1$ to $ZV_n$).

7. The optical communication-transmitting method as defined in claim 5, further comprising preventing mutual interferences between optical carrier signals of different ones of said intermediate repeaters by said time-division multiplex method.

8. The optical communication-transmitting method as defined in claim 5, further comprising creating a time frame comprising a plurality of time slots (S, $V_1$ to $V_n$) by means of the optical transmitter ($S_{ss}$) disposed in the at least one transmitting station (SS) and inserting the at least one additional signal (ZS) of the transmitting station (SS) into a first time slot (S) of said time frame.

9. The optical communication-transmitting method as defined in claim 8, further comprising receiving and converting the at least one additional signal (ZS) in one of the intermediate repeaters together with additional data in said specific time slot ($V_1$ to $V_n$) assigned to said one of said intermediate repeaters and then generating and transmitting the at least one further additional signal derived therefrom in said one of the intermediate repeaters ($ZV_1$ to $ZV_n$).

10. The optical communication-transmitting method as defined in claim 6, further comprising creating a time frame for at least one other additional signal ($ZV_1$ to $ZV_2$) when said at least one additional signal (ZS) is not received in one of said intermediate repeaters and inserting the at least one other additional signal ($ZV_1$ to $ZV_2$) into a first time slot of the time frame.

11. The optical communication-transmitting method as defined in claim 5, wherein the optical carrier signal transmitting the at least one additional signal is wide-band in comparison to a bandwidth of a carrier signal by which said at least one useful signal is transmitted.

12. The optical communication-transmitting method as defined in claim 11, further comprising generating the optical carrier signal for the at least one additional signal by means of a luminescence diode.

13. The optical communication-transmitting method as defined in claim 11, wherein both the optical carrier signals are located within an amplification range of said optical amplifiers ($ZV_1$ to $ZV_n$).

14. The optical communication-transmitting method as defined in claim 5, wherein the optical carrier signal transmitting the at least one additional signal is a narrow-band signal.

15. The optical communication-transmitting method as defined in claim 14, further comprising generating the narrow-band signal by means of a semiconductor laser.

* * * * *